(12) United States Patent
Box et al.

(10) Patent No.: US 8,477,426 B2
(45) Date of Patent: Jul. 2, 2013

(54) DISPLAY DEVICE, NOTABLY FOR A MOTOR VEHICLE

(75) Inventors: Benoit Box, Parmain (FR); Jean-Luc Croy, Limeil Brevannes (FR); Sebastien Hervy, La Garenne Colombes (FR); Pierre Bascoul, Cergy (FR); Philippe Fedorawiez, Triel sur Seine (FR); Giany Pitte, Osny (FR); Olivier Luneau, Auvers sur Oise (FR); Georges Prigent, Le Mans (FR); Pascal Choquart, Cergy Saint Christophe (FR)

(73) Assignee: Johnson Controls Technology Company, Holland, MI (US)

( * ) Notice: Subject to any disclaimer, the term of this patent is extended or adjusted under 35 U.S.C. 154(b) by 219 days.

(21) Appl. No.: 12/943,484

(22) Filed: Nov. 10, 2010

(65) Prior Publication Data

US 2011/0134535 A1   Jun. 9, 2011

(30) Foreign Application Priority Data

Nov. 10, 2009  (DE) ...................... 10 2009 053 025.8
Nov. 3, 2010  (EP) .................................... 10014240

(51) Int. Cl.
    *G02B 27/14* (2006.01)
(52) U.S. Cl.
    USPC .......................................................... 359/632

(58) Field of Classification Search
    USPC ....... 359/13, 14, 630–634; 345/7, 8; 348/115; 349/11
    See application file for complete search history.

(56) References Cited

U.S. PATENT DOCUMENTS

| 5,214,413 | A | 5/1993 | Okabayashi et al. |
| 6,930,836 | B2 * | 8/2005 | Harada et al. ................. 359/632 |
| 2005/0024490 | A1 | 2/2005 | Harada et al. |
| 2005/0259034 | A1 | 11/2005 | Harada et al. |

FOREIGN PATENT DOCUMENTS

| FR | 2681702 A1 | 3/1993 |
| JP | 2007182132 | 7/2007 |
| WO | 9820380 A1 | 5/1998 |

OTHER PUBLICATIONS

European Search Report mailed Apr. 13, 2011.

* cited by examiner

*Primary Examiner* — Joseph P Martinez
(74) *Attorney, Agent, or Firm* — Fletcher Yoder P.C.

(57) ABSTRACT

A display device for a motor vehicle includes a projection module for generating an image for projection in a normal direction of looking of a user long an optical path. The display device comprises a reflection element capable of being moved between a first rest position and a second display position. The reflection element in its display position is provided in the normal direction of looking of the user. When the reflection element moves between its first rest position and its second display position, it is subjected to rotary movement about a fixed axis of rotation.

5 Claims, 2 Drawing Sheets

DISPLAY DEVICE, NOTABLY FOR A MOTOR VEHICLE

CROSS REFERENCE TO RELATED APPLICATIONS

Figure 1:
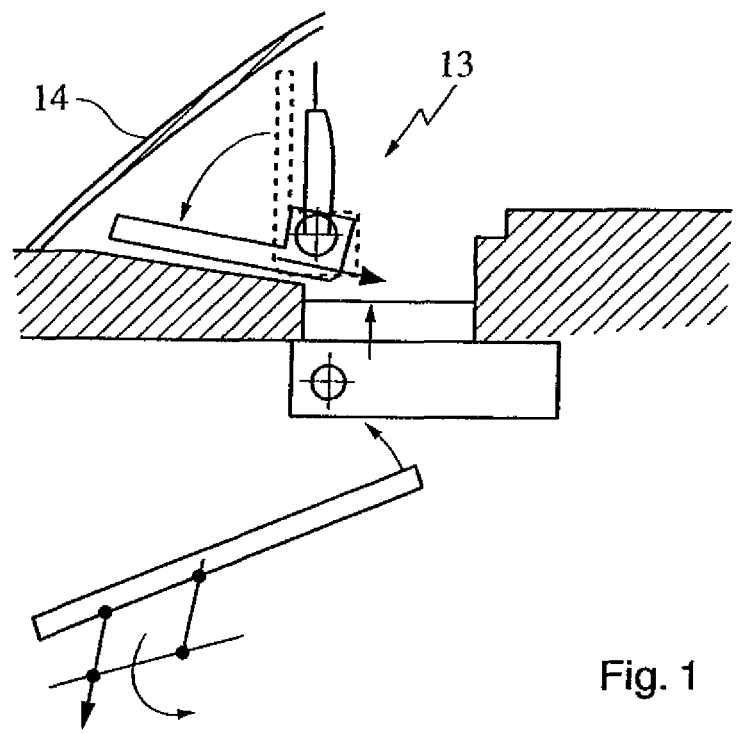

This application claims priority from and the benefit of German Patent No. DE 10 2009 053 025.8, filed on Nov. 10, 2009 and European Application No. EP 100142240, filed on Nov. 3, 2010; all entitled "Display Device, Notably for a Motor Vehicle", which are herein incorporated by reference.

BACKGROUND

The present invention relates to a display device, notably for a motor vehicle.

Display devices of the head up display type (HUD) are known, notably with the projection of an image toward a windshield as described in document U.S. Pat. No. 5,214,413 or toward a reflection element.

Head up display devices make it possible to project information in the field of view of the space in front of the motor vehicle so that the driver of the motor vehicle can read this information without taking his eyes off the space in front of the motor vehicle. At the same time, the information can be read without changing the focus of the eyes of the driver of the vehicle.

It is advantageous that—depending on the requirements and the tastes of a user of the vehicle—the reflection element can either be used or be in a state of rest.

A drawback of such devices according to the prior art lies in the fact that the change of position of the reflection element and of a cover means requires the use of often complicated mechanical means which, moreover, have weaknesses during daily and prolonged use over several years.

SUMMARY

The main object of the invention is to alleviate the drawbacks of the prior art and notably those cited above, and a further object is to propose a head up display device having a reflection element and a cover means making it possible to cover the reflection element in a first rest position, the display device comprising a mechanism having great stability and an extended service life despite frequent use.

According to the present invention, this object is achieved by a display device, notably for a motor vehicle, comprising a projection module for generating an image for the purpose of a projection in the normal direction of looking of a user of the display device along an optical path, the display device comprising a reflection element that is capable of being moved between a first rest position and a second display position, the reflection element in its display position being provided in the normal direction of looking of the user, the reflection element being subjected to a rotary movement about a fixed axis of rotation when the reflection element moves between its first rest position and its second display position.

Through such an embodiment of a display device, it is advantageously possible to produce the mechanism for moving the reflection element and the cover means in a simple and stable manner.

Another preferred enhancement of the invention lies in the fact that the display device comprises a cover means for the reflection element, the cover means covering the reflection element when the latter is positioned in its first rest position.

Through such an embodiment of a display device, it is advantageously possible to eliminate or at least reduce the risk of damage to the reflection element when the latter is in its first rest position.

Another preferred enhancement of the invention lies in the fact that the cover means is capable of being moved between a third closed position and a fourth open position, the third closed position corresponding to the cover means covering the reflection element and, when the cover means moves between its third closed position and its fourth open position, the cover means is subjected to a rotary movement about another fixed axis of rotation.

Through such an embodiment of a display device, it is advantageously possible to provide the movement of the cover means also in a simple and mechanically stable manner.

A particularly preferred enhancement of the invention lies in the fact that a fifth position of the cover means corresponds to an intermediate position between its third closed position and its fourth open position, that the rotary movement of the reflection element between its first rest position and its second display position and the rotary movement of the cover means between its third closed position and its fifth position is provided in a simultaneous manner, and that, during the rotary movement of the cover means between its fifth position and its fourth open position, the reflection element is provided in its second display position.

Through such an embodiment of a display device, it is advantageously possible to make the driving of the reflection element and of the cover means easier so as to provide a single motor means for achieving the change-of-position movement.

According to a variant of the present invention, it is also preferred that the axis of rotation of the reflection element and the other axis of rotation of the cover means are physical axes.

Another preferred enhancement of the invention lies in the fact that at least the axis of rotation of the reflection element or the other axis of rotation of the cover means is a virtual axis of rotation, achieved by means of a link rod.

Through such an embodiment of a display device, it is advantageously possible to provide very good use of the space provided for the reflection element and the cover means.

A preferred enhancement of the invention lies in the fact that the axis of rotation of the reflection element and the other axis of rotation of the cover means are identical.

Other features and advantages of the invention will emerge from reading the following description of a particular non-limiting embodiment of the present invention.

DRAWINGS

Figure 2:
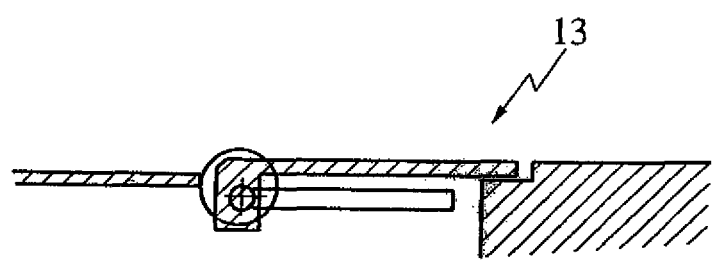
Figure 3:
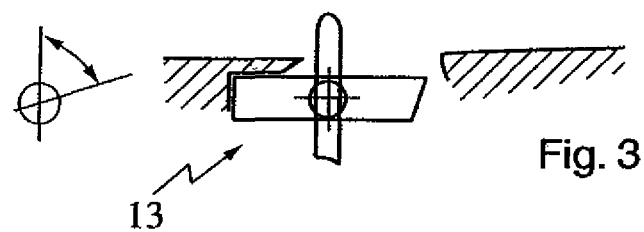
Figure 4:
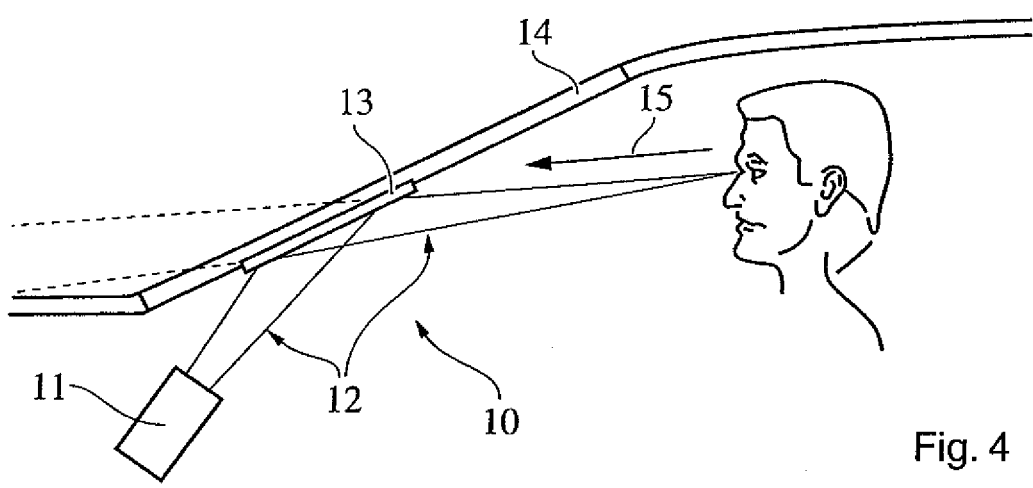

The invention will be better understood thanks to the following description which relates to preferred embodiments given as nonlimiting examples and explained with reference to the appended schematic drawings in which:

FIGS. 1-3 are schematic views in section of a reflection element of a display device according to a first variant of the present invention, and FIG. 4 is a schematic view in section of a display device according to the present invention.

DETAILED DESCRIPTION

As shown in FIG. 4 of the appended drawing, a display device 10 according to the present invention comprises a projection module 11 which generates an image in the normal direction of looking 15 of a user of the display device 10 along an optical path 12.

The optical path 12 normally comprises at least one reflection element 13. In this manner, the optical path 12 may comprise a (single) reflection element as shown in FIG. 4. Moreover, the optical path 12 may also comprise two reflection elements. The display device 10 may also comprise—in another variant not shown in the figures—more than two reflection elements 13.

The normal direction of looking 15 is the direction of view of a user of the display device 10, notably a vehicle driver, when the latter looks notably through a windshield 14, at the outside which is in front of the vehicle.

According to the present invention, the reflection element 13 is an element positioned away from the windshield 14. The reflection element 13 may be positioned in a first rest position and in a second display position. When the reflection element 13 is positioned in its first rest position, the reflection element 13 is typically oriented in a virtually horizontal manner, and when the reflection element 13 is positioned in its second display position, the reflection element 13 is typically positioned upright or virtually vertically so that the user of the display device can look through the reflection element 13.

According to the present invention, the reflection element 13—when the reflection element 13 is moved between its first rest position and its second display position—is subjected to a rotary movement about an axis of rotation as shown in FIGS. 1 to 3.

Preferably, the fixed axis of rotation is a physical axis of rotation as shown in FIGS. 1 and 2.

In an alternative embodiment of the present invention, the rotation of the reflection element 13 is achieved through a link rod as shown in FIG. 3. Through such an embodiment, a virtual axis of rotation is defined by virtue of the common action of four levers in order to tilt the reflection element 13 between its rest position and its display position.

According to a preferred embodiment of the invention, a cover means is provided to cover the reflection element 13 when the latter is positioned in its first rest position. In such a situation, the cover means is positioned in a third closed position. The cover means is also subjected to a rotary movement between its third closed position and its fourth open position. This rotary movement is achieved about another axis of rotation (relative to the axis of rotation of the reflection element 13).

When the reflection element 13 is positioned in its second display position, the cover means must be positioned in a fourth open position. In FIG. 2, the cover means is shown in its fourth open position (shown with a continuous line in FIG. 2). Between a fifth position of the cover means (shown by a dashed line in FIG. 2) and the fourth position of the cover means, the latter can be turned about the other axis of rotation while the reflection element 13 remains positioned in its second display position. The opening movement of the assembly of the reflection element 13 and the cover means can therefore be divided into a first phase of common rotary movement about the axis of rotation and about the other axis of rotation and a second phase of movement of the cover means only, the movement of the reflection element 13 being stopped by an abutment. Therefore, the whole of the movement of the cover means and of the reflection element 13 can be driven by a common motor means.

LIST OF REFERENCES 10 display device
11 projection module
12 optical path
13 reflection element
14 windshield
15 normal direction of looking

The invention claimed is:

1. A display device for a motor vehicle, comprising a projection module for generating an image for projection in a normal direction of looking of a user of the display device along an optical path, the display device comprising a reflection element that is capable of being moved between a first rest position and a second display position, the reflection element in its display position being provided in the normal direction of looking of the user, wherein, when the reflection element moves between its first rest position and its second display position, the reflection element is subjected to a rotary movement about a fixed axis of rotation, wherein the display device comprises a cover means for the reflection element, the cover means covering the reflection element when the reflection element is positioned in its first rest position, wherein the cover means is capable of being moved between a third closed position and a fourth open position, the third closed position corresponding to the cover means covering the reflection element and, when the cover means moves between its third closed position and its fourth open position, the cover means is subjected to a rotary movement about another fixed axis of rotation, wherein a fifth position of the cover means corresponds to an intermediate position between its third closed position and its fourth open position, wherein the rotary movement of the reflection element between its first rest position and its second display position and the rotary movement of the cover means between its third closed position and its fifth position is provided in a simultaneous manner, and wherein, during the rotary movement of the cover means between its fifth position and its fourth open position, the reflection element is provided in its second display position.

2. The display device as claimed in claim 1, wherein the axis of rotation of the reflection element and the other axis of rotation of the cover means are physical axes.

3. The display device as claimed in claim 1, wherein at least the axis of rotation of the reflection element or the other axis of rotation of the cover means is a virtual axis of rotation.

4. The display device as claimed in claim 3, comprising a link rod configured to establish the virtual axis of rotation.

5. The display device as claimed in claim 1, wherein the axis of rotation of the reflection element and the other axis of rotation of the cover means are identical.

\* \* \* \* \*